United States Patent [19]

Reilly et al.

[11] 3,873,348

[45] Mar. 25, 1975

[54] PAINTABLE RUBBER COMPOSITION AND PRODUCTS

[75] Inventors: Albert F. Reilly, Bloomfield Hills; Ivan C. Doddridge, Woodhaven; Ming Chih Chen, Saint Clair Shores, all of Mich.

[73] Assignee: Sheller-Globe Corporation, Toledo, Ohio

[22] Filed: May 9, 1973

[21] Appl. No.: 358,514

[52] U.S. Cl........ 117/72, 117/47 A, 117/138.8 UA, 260/33.6 AQ, 264/129, 293/71 R
[51] Int. Cl...................... B32b 25/08, C08d 13/24
[58] Field of Search............ 117/75, 72, 138.8 UA, 117/132 CB, 161 UD, 161 UH, 139; 260/33.6 AQ; 293/71 R, 71 P

[56] References Cited
UNITED STATES PATENTS

| | | | |
|---|---|---|---|
| 2,873,215 | 2/1959 | Quigley et al. | 117/132 CB |
| 3,003,893 | 10/1961 | Mertz | 117/132 CB X |
| 3,231,410 | 1/1966 | Huber et al. | 117/132 CB X |
| 3,577,261 | 5/1971 | Klar | 117/139 X |
| 3,623,900 | 11/1971 | Jonnes et al. | 117/139 X |
| 3,709,848 | 1/1973 | Gerstin et al. | 260/33.6 AQ |
| 3,766,124 | 10/1973 | Tompkins | 260/33.6 AQ |

Primary Examiner—Ralph Husack
Attorney, Agent, or Firm—Harness, Dickey & Pierce

[57] ABSTRACT

A new paintable rubber composition made of a special formulation of materials including, for example, an SBR rubber elastomer and a special thermoplastic polymeric stiffening agent which provides the cured composition with a high flex modulus and also the cured composition is operative to prevent the final product formed therewith from fluttering and/or sagging during automotive usage and the cured composition or product is resilient and recoverable to its original shape after deflection; and, a method of manufacturing a flexible paintable rubber product using the new composition herein.

18 Claims, No Drawings

PAINTABLE RUBBER COMPOSITION AND PRODUCTS

BACKGROUND OF THE INVENTION

This invention relates to a paintable rubber product for providing a filler structure on automotive vehicles. Also, the invention broadly relates to a new rubber composition and a method of manufacturing products therewith.

The state of the art is indicated by the following references: U.S. Pat. Nos. 3,231,634, 3,256,362, 3,511,792, 3,577,480; and, Enjay Chemical Company Technical circular, EPL-7204, for "Vistalon Formula 11.401—A New Paintable Base Compound;" and, Copolymer Rubber and Chemical Corporation, Technical circular entitled "EPsynEPDM. . . . The paintable EPDM you compound yourself;" and, DuPont Technical circular for DuPont's Nordel No. 2903, EPDM System.

One object of this invention is to prepare a new paintable rubber product with a colored paint coating thereon, said coating being of a flexible, color stable nature and with said product having a high flex modulus, and also possessing the properties of being resilient and generally recoverable to its original shape after deflection.

Another object of this invention is to provide a new rubber composition and method of manufacturing products therewith.

Another object of this invention is to provide a new rubber composition and product which are more economical from a cost standpoint.

Another object of this invention is to provide a new rubber composition and product wherein the curing rates are faster thus allowing faster cycle times than were generally possible with prior compositions (i.e., faster but yet color stable when painted).

Another object of the present invention is to provide a new rubber composition and product wherein the flow characteristics of the composition are better suited for molding or extruding a product to be manufactured.

Another object of the present invention is to provide a new system for manufacturing a paintable rubber product wherein ultraviolet surface activation is not necessary in order to achieve good paint adhesion.

Other objects, features and advantages of the present invention will become apparent from the subsequent description and the appended claims.

SUMMARY OF THE INVENTION

Briefly stated, the present invention concerns a paintable rubber product for providing a filler structure on automotive vehicles and said products are characterized by high modulus and resistance to fluttering and/or sagging during automotive usage and being resilient and recoverable to its original shape after deflection, comprising, percentages being by weight, (a) about 15% to about 90% of a cross-linkable rubber material selected from at least one of the group consisting of styrene butadiene rubber, polybutadiene rubber, and isoprene rubber, said rubber material also including up to 50% of ethylene-propylene diene monomer rubber or neoprene rubber, (b) about 0.01% to about 40% of a thermoplastic polymeric stiffening agent for providing a high flex modulus for the produce and being selected from at least one of the group consisting of an ethylene-ethyl acrylate copolymer, acrylonitrile butadiene styrene, polyvinyl chloride, ethylene vinyl acetate, a thermoplastic ethylene-propylene copolymer, an acrylic resin, a cellulosic resin, and a $C_2$-$C_4$ polyolefinic polymer material, (c) zero to about 50% of a plasticizing agent, (d) zero to about 5% of an accelerating agent, (e) 0.01% to about 10% of a curing agent, (f) zero to about 10% of an activating agent, (g) zero to about 80% of a filler material, and a colored paint coating layer on said product operative to provide a desired color and made of a flexible color stable paint.

In another aspect, the present invention concerns a flexible paintable rubber composition for exterior automotive usage and the like comprising, percentages being by weight, (a) about 15% to about 90% of a cross-linkable rubber material selected from at least one of the group consisting of styrene butadiene rubber, polybutadiene rubber, and isoprene rubber, said rubber material also including less than 50% of ethylene-propylene diene monomer rubber or neoprene rubber, (b) about 0.01% to about 40% of a polymeric stiffening agent for providing a high flex modulus for the cured composition, (c) zero to about 50% of a plasticizing agent, (d) zero to about 5% of an accelerating agent, (e) 0.01% to about 10% of a curing agent, (f) zero to about 10% of an activating agent, (g) zero to about 80% of a filler material, and a colored paint coating layer on said composition operative to provide a desired color and made of a flexible color stable paint, said composition in cured form being generally operative to prevent fluttering and sagging and being resilient and generally recoverable to its original position after deflection.

From a method aspect, this invention concerns manufacturing a flexible paintable rubber product by the steps of: formulating a composition comprising, percentages being by weight, (a) about 15% to about 90% of a cross-linkable rubber material selected from at least one of the group consisting of styrene butadiene rubber, polybutadiene rubber, and isoprene rubber, said rubber material also including less than 50% of ehtylene-proplyene diene monomer rubber of neoprene rubber, (b) about 0.01% to about 40% of a thermoplastic polymeric stiffening agent for providing a high flex modulus for the cured composition, (c) zero to about 50% of a plasticizing agent, (d) zero to about 5% of an accelerating agent, (e) 0.01% to about 10% of a curing agent, (f) zero to about 10% of an activating agent, (g) zero to about 80% of a filler material, and forming the product by molding said composition and curing the product at a temperature between about 275°F and about 400°F for a time period between about 20 minutes and about ½ minute, preparing a clean surface on the molded product, applying a flexible color stable colored paint coating to the product.

DESCRIPTION OF THE PREFERRED EMBODIMENTS

The cross-linkable rubber material used in the invention should be selected from the group of styrene butadiene rubber (SBR), polybutadiene, and isoprene rubber. The cross-linkable rubber material may also optionally include up to 50% of ethylene-propylene diene monomer rubber (EPDM) or neoprene rubber. Preferably, though, the inclusion of this optional EPDM or neoprene rubber material in the cross-linkable rubber material referred to above is maintained at a level below 15% by weight of the cross-linkable rubber material and best results appear to be obtained without the presence of any EPDM or neoprene rubber.

The amount of said cross-linkable rubber material should broadly be between about 15% and about 90% by weight of the composition and preferably it should be between about 25% and 60% of the composition, with best results being obtained within the range of about 30% to about 55% by weight of the composition.

The thermoplastic polymeric stiffening agent means in accordance with this invention has been discovered to provide a high flex modulus for the cured composition or final product formed and this polymeric stiffening agent is one selected from the group consisting of ethylene-ethyl acrylate copolymer, acrylonitrile butadiene styrene, polyvinyl chloride, ethylene vinyl acetate, a thermoplastic ethylene-propylene copolymer, an acrylic resin, a cellulosic resin, and a $C_2$-$C_4$ polyolefinic polymer material. This stiffening agent may also be made at least in part from a $C_2$-$C_4$ polyolefin/acrylic copolymer material.

The amount of the polymeric stiffening agent present in the composition should broadly be within the range of about 0.01% up to about 40% by weight of the composition and preferably it should be maintained within the range of about 0.1% up to about 25% by weight of the composition, with best results being obtained when it is maintained within the range of about 5% to about 20% by weight of the composition.

The plasticizing agent utilized in the composition should be present within the broad range of about zero up to about 50% by weight of the composition, and preferably, it should be maintained in the range of 0.01% up to about 35% by weight of the composition, with best results being obtained using the plasticizing agent within the range of about 1% to about 15% by weight. The plasticizing agent should be a compatible non-staining, non-discoloring plasticizer such as the various plasticizing oils, for example, Flexon 766 or Sunthene 410; or, various other high quality napthenic oils or various parafinic materials, or various low molecular weight polyester plasticizers may also be used. Other plasticizers which may be used in this invention are disclosed in commonly assigned copending application Ser. No. 135,787, filed Apr. 20, 1971, now abandoned the disclosure of which is hereby incorporated herein by reference.

The accelerating agent used in the composition should broadly be present within the range of about zero up to about 5% by weight of the composition, and preferably, it should be present within the range of about zero to about 3% by weight, with best results being obtained in the range of about 0.01% up to about 3% by weight of the composition when other than a peroxide curing agent is used. The accelerating agent is generally not necessary when a peroxide curing agent is used for the composition. The accelerating agents which are useful herein are of a type well known in the art, such as cumate, altax, and captax.

The curing agent used in the composition should broadly be within the range of about 0.01% to about 10% by weight of the composition and preferably, it should be within the range of about 0.5% to about 5%, with best results being obtained when it is maintained within the range of about 0.5% to about 3% by weight of the composition. The composition may be sulfur cured or cured with a peroxide curing agent or numerous other curing agents may be used such as Schenectady SP-1055 curing agent, a phenol curing agent, a quinone curing agent, or an amino type curing agent.

The activating agent used in the composition should be present within the broad range of about zero up to about 10% by weight of the composition and preferably, it should be present within the range of about 0.01% to about 5% by weight, with best results being obtained within the range of about 0.1% to about 3% by weight of the composition. The activating agent may be a material such as zinc oxide, stearic acid, and various stearates such as zinc stearate. Numerous different activating agents may be useful in the invention which activating agents are known in the art.

The filler material which may optionally be included in the composition may be present within the broad range of about zero up to 80% by weight of the composition, and preferably, it should be maintained within the range of about zero up to about 60% by weight of the composition, with best results being obtained when a filler material is used within the range of about 1% to about 50% by weight of the composition. Any non-discoloring filler material may be used such as carbon black, various carbonate fillers, clays, sulfates, and various silicas. Other filler materials will be apparent to those skilled in the art.

The cured composition discovered and disclosed in accordance with the invention herein finds highly satisfactory and advantageous uses, such as for paintable rubber sightshield products in the automotive field, for various bumper products in the automotive field, for fender extensions, filler panels, hoods, trunk lids, and the like all in the automotive vehicular field. Numerous other highly useful applications of this invention may be found where an exteriorly used flexible paintable rubber product is required.

After the composition is molded and cured as referred to above, it is generally prepared for painting by cleaning the surface thereof which is to be painted either with solvents or a detergent wash or otherwise properly cleaning the surface. Then generally we have found that the surface to be painted should be properly activated to obtain good paint adhesion in accordance with our invention. The surface activation may be carried out by halogenation of the surface such as by chlorination, or by ozone treatment, treatment with ultraviolet light, flame treatment, or electronic treatment. In certain instances surface activation is not necessary with some flexible color stable paints which may be used on the cured molded composition in accordance with our invention. It is to be noted in accordance with this invention that ultraviolet treatment of the surface is not necessary and that the surface may be prepared in a very able fashion to obtain good paint adhesion by chlorination of the surface to be painted.

After the surface is prepared for painting, it is our finding that generally a paint primer coating should preferably first be applied although this is optional and not absolutely necessary. Then a colored paint coating layer means is applied to the product using a flexible color stable paint coating such as a paint selected from the group of resinous coatings consisting of a urethane resin coating, an acrylic resin coating, or a polyester resin coating or combinations thereof. Application of these coatings may be by spraying, brushing, rolling, electrostatic application of the like. As mentioned, the application of a primer coating is not absolutely necessary. However, it is generally more economical to use a primer coating because the application of a thicker colored paint coating which would be necessary without a primer coating requires the application of a thick paint coating which has an expensive coloring pigment system therein.

The advantages of the invention should be fairly apparent from the inventive disclosure above. However, it is believed in particular that the following advantages are obtainable with this invention: (1) The new rubber composition herein is quicker curing and thus the mold cycle times are reduced. (2) The new rubber product herein is more economical because less costs are involved in obtaining the raw materials used in this invention. (3) Better processability is obtained using the new rubber composition herein. (4) With the new rubber composition herein, it is generally easier to get proper adhesion with the overlying paint layers. (5) With the new composition herein, the final product properties are either equivalent to or better than prior compositions. (6) With the new composition herein, improved weatherability of paints on the product substrate is obtainable. (7) The rubber composition and system of manufacturing a paintable rubber product in accordance with this invention does not require ultraviolet treatment of the surface of the cured rubber composition in order to achieve good paint adhesion. (8) In prior compositions based on EPDM rubber, these prior compositions have generally possessed relatively high viscosities which cause undesireable flow properties in molding, whereas the composition of this invention possesses much improved flow properties and thus the composition and product of this invention are much better suited for molding than the prior compositions.

In order to further illustrate the invention, the following examples are provided. It is to be understood, however, that the examples are included for illustrative purposes and are not intended to be limiting of the scope of the invention as set forth in the subjoined claims.

EXAMPLE 1

| Material | Parts | % wgt. |
|---|---|---|
| SBR 1502 | 75 | 40 |
| DPD 6169 (ethylene ethylacrylate) | 25 | 13.5 |
| FEF Black | 70 | 37.5 |
| Sunthene 410 (naphthenic processing oil) | 8 | 4.3 |
| Zinc Oxide | 3 | 1.6 |
| Zalba Special (antioxidant) | 0.5 | .27 |
| Stearic acid | 0.5 | .27 |
| Cumate | 0.1 | .0054 |
| Altax | 2.0 | 1.07 |
| Spider Sulfur | 2.0 | 1.07 |
| TE 28E (Technical Processing Inc., organic processing aid (1) | 0.5 | .27 |
| Total | 186.6 | |
| Specific gravity | 1.18 | |

EXAMPLE 2

| Ingredients | Parts |
|---|---|
| Ameripol 1502 (SBR rubber) | 75.0 |
| DPD 6169 | 25.0 |
| FEF Black | 70.0 |
| 766 Oil (Flexon) | 8.0 |
| ZNO | 3.0 |
| Zalba Special | 0.5 |
| Stearic Acid | 0.5 |
| Cumate | 0.1 |
| MBTS (accelerator-benzo thiazyl disulfide) | 2.0 |
| Sulfur | 2.0 |

EXAMPLE 2-Continued

| Ingredients | Parts |
|---|---|
| TE 28-E | 0.5 |
| CaO | 2.0 |
| Specific gravity - 1.18 | |

EXAMPLE 3

| Ingredients | Parts |
|---|---|
| SBR 1502 | 75.0 |
| DPD 6169 | 35.0 |
| FEF 550 | 70.0 |
| Sunthene 410 | 8.0 |
| ZnO | 3.0 |
| Stearic Acid | 0.5 |
| Zalba Special | 0.5 |
| Cumate | 0.1 |
| Altax | 2.0 |
| Spider Sulfur | 2.0 |
| TE-28-E | 0.5 |
| Mooney Scorch/ 280°F | |
| Minimum | 18 |
| T 10 | 9.5 |
| Mooney Scorch/ 250°F | |
| Minimum | 20.0 |
| T 10 | 23.0 |
| Cure Time (min)/ Temperature | 35/350°F |
| Hot Tear | Excellent |
| Snap | Excellent |
| Durometer | 82 |
| 100% Modulus | 1000 |
| Tensile | 2200 |
| Elongation | 240 |
| Tear | 225 |

EXAMPLE 4

| Ingredients | Parts |
|---|---|
| SBR 1519 | |
| Copo 1815 | 137.0 |
| Epsyn 55 | 35.0 |
| Statex M FEF | |
| SRF 774 | 60.0 |
| Sunthene 410 | |
| DPD 6169 | 15.0 |
| Zalba Special | |
| TE-80 | 0.1 |
| Stearic Acid | |
| ZnO | 5.0 |
| Cumate | 0.2 |
| Altax | 2.8 |
| Spider Sulfur | 2.5 |
| Mooney Scorch/280°F | |
| Minimum | 35 |
| T 10 | 9.0 |
| Press Cured | 3/350 |
| Snap | Excellent |
| Durometer | 80 |
| Tensile | 1700 |
| 100% Modulus | 1050 |
| Elongation | 170 |
| Tear | 128 |

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A paintable rubber sightshield product for providing a filler structure on automotive vehicles and being operative to prevent fluttering and/or sagging during automotive usage and being resilient and recoverable to its original shape after deflection, comprising, percentages being by weight,
  a. about 15% to about 909% of a cross-linkable rubber material selected from 90least one of the group consisting of,
    styrene butadiene rubber, polybutadiene rubber, and isoprene rubber,
    said rubber material also including up to 50% of ethylene-propylene diene monomer rubber or neoprene rubber,
  b. about 0.01% to about 40% of a polymeric stiffening agent for providing a high flex modulus for the product and being selected from at least one of the group consisting of,
    acrylonitrile butadiene styrene, polyvinyl chloride, a cellulosic resin, and a $C_2$-$C_4$ polyolefinic polymer material,
  c. zero to about 50% of a plasticizing agent selected from at least one material of the group consisting of naphthenic and paraffinic oils,
  d. zero to about 5% of an accelerating agent,
  e. 0.01% to about 10% of a curing agent,
  f. zero to about 10% of an activating agent,
  g. zero to about 80% of a filler material, and
a colored paint coating layer on said product operative to provide a desired color and made of a flexible color stable paint, and said product being a cured product.

2. The invention of claim 1 wherein,
said rubber material includes less than 15% of ethylene-propylene diene monomer rubber or neoprene rubber, and the product is sulfur cured.

3. The invention of claim 1 wherein,
component (b) is present from about 0.01% to about 25%, component (c) is present from about 0.01% to about 35%, component (d) is present from about zero to about 3%, component (e) is present from about 0.05% to about 5%, component (f) is present from about 0.01% to about 5%, and component (g) is present from about zero to about 60%.

4. The invention of claim 3 wherein,
component (a) is present from about 25% to about 60%, and the product is sulfur cured.

5. The invention of claim 1 wherein,
component (b) is at least in part a $C_2$-$C_4$ polyolefin/acrylic copolymer material.

6. The invention of claim 1 wherein,
component (b) is at least in part an ethylene-ethyl acrylate copolymer material.

7. The invention of claim 1 further characterized as including,
a flexible primer paint coating composition on the product, underneath said flexible color stable colored paint coating layer.

8. The invention of claim 1 wherein,
said colored paint coating layer being selected from at least one resin coating material from the group consisting of a urethane resin, an acrylic resin, and a polyester resin.

9. The invention of claim 1 wherein,
component (a) is present from about 30% to about 55%, component (b) is present from about 5% to about 20%, component (c) is present from about 1% to about 15%, component (d) is present from about 0.01% to about 3%, component (e) is present from about 0.5% to about 3%, component (f) is present from about 0.1% to about 3%, and component (g) is present from about 1% to about 50%.

10. A flexible paintable rubber composition for exterior automotive usage and the like comprising, percentages being by weight,
  a. about 15% to about 90% of a cross-linkable rubber material selected from at least one of the group consisting of,
    styrene butadiene rubber, polybutadiene rubber, and isoprene rubber,
    said rubber material also including less than 50% of ethylene-propylene diene monomer rubber or neoprene rubber,
  b. about 0.01% to about 40% of a polymeric stiffening agent for providing a high flex modulus for the cured composition, and being selected from at least one of the group consisting of,
    acrylonitrile butadiene styrene, polyvinyl chloride, a cellulosic resin, and a $C_2$-$C_4$ polyolefinic polymer material,
  c. zero to about 50% of a plasticizing agent selected from at least one material of the group consisting of naphthenic and paraffinic oils,
  d. zero to about 5% of an accelerating agent,
  e. 0.01% to about 10% of a curing agent,
  f. zero to about 10% of an activating agent,
  g. zero to about 80% of a filler material, and
a colored paint coating layer on said composition operative to provide a desired color and made of a flexible color stable paint,
  said composition in cured form being generally operative to prevent fluttering and sagging and being resilient and generally recoverable to its original position after deflection.

11. The invention of claim 10 wherein,
said rubber material includes less than 15% of ethylene-propylene diene monomer rubber or neoprene rubber.

12. The invention of claim 10 wherein,
component (b) is present from about 0.01% to about 25%, component (c) is present from about 0.01% to about 35%, component (d) is present from about zero to about 3%, component (e) is present from about 0.05% to about 5%, component (f) is present from about 0.01% to about 5%, and component (g) is present from about zero to about 60%.

13. The invention of claim 10 wherein,
component (a) is present from about 25% to about 60%.

14. The invention of claim 10 wherein,
component (b) is at least in part a $C_2$-$C_4$ polyolefin/acrylic copolymer material.

15. The invention of claim 10 wherein,
component (b) is at least in part an ethylene-ethyl acrylate copolymer material.

16. The invention of claim 10 further characterized as including,
a flexible primer paint coating composition on said rubber composition, underneath said flexible color stable colored paint coating layer.

17. The invention of claim 10 wherein,
said colored paint coating layer being selected from at least one resin coating material from the group consisting of a urethane resin, an acrylic resin, and a polyester resin.

18. The invention of claim 10 wherein, component (a) is present from about 30% to about 55%, component (b) is present from about 5% to about 20%, component (c) is present from about 1% to about 15%, component (d) is present from about 0.01% to about 3%, component (e) is present from about 0.5% to about 3%, component (f) is present from about 0.1% to about 3%, and component (g) is present from about 1% to about 50%.

* * * * *

UNITED STATES PATENT OFFICE
CERTIFICATE OF CORRECTION

PATENT NO. : 3,873,348
DATED : March 25, 1975
INVENTOR(S) : Albert F. Reilly, Ivan C. Doddridge, Ming Chih Chen It is certified that error appears in the above-identified patent and that said Letters Patent are hereby corrected as shown below:

Column 5, line 53, "organic processing aid (1)" should read -- organic processing aid --. Column 7, line 3, the numeral "909%" should read -- 90% --. Column 7, line 4, the terminology "90 least" should read -- at least --.

Signed and sealed this 20th day of May 1975.

(SEAL)
Attest:

RUTH C. MASON
Attesting Officer

C. MARSHALL DANN
Commissioner of Patents
and Trademarks